United States Patent
Funatsu

(10) Patent No.: US 10,904,442 B2
(45) Date of Patent: Jan. 26, 2021

(54) IMAGE SENSING APPARATUS WITH IMPROVED USER OPERABILITY WHEN PERFORMING AN ENLARGED DISPLAY OF A LIVE VIEW IMAGE AND CONTROL METHOD OF IMAGE SENSING APPARATUS

(71) Applicant: CANON KABUSHIKI KAISHA, Tokyo (JP)

(72) Inventor: Yoshihiro Funatsu, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/509,566

(22) Filed: Jul. 12, 2019

(65) Prior Publication Data

US 2020/0021748 A1 Jan. 16, 2020

(30) Foreign Application Priority Data

Jul. 13, 2018 (JP) ................................. 2018-133360

(51) Int. Cl.
*H04N 5/232* (2006.01)
(52) U.S. Cl.
CPC ............................ *H04N 5/232933* (2018.08)
(58) Field of Classification Search
CPC ......... H04N 5/232933; H04N 5/23209; H04N 5/23245; H04N 5/232127; H04N 5/23296; H04N 5/232935; H04N 5/232945; H04N 5/23216; H04N 5/2393
USPC ............................ 348/333.03, 333.12, 333.11
See application file for complete search history.

(56) References Cited

U.S. PATENT DOCUMENTS

| | | | | |
|---|---|---|---|---|
| 2008/0204587 A1* | 8/2008 | Takahara | ............ | H04N 5/23293 348/333.01 |
| 2012/0274815 A1* | 11/2012 | Matsumoto | .......... | H04N 9/8042 348/240.99 |
| 2013/0064533 A1* | 3/2013 | Nakata | .................... | G03B 17/02 396/76 |
| 2013/0194215 A1* | 8/2013 | Toida | ...................... | G06F 3/041 345/173 |
| 2014/0232924 A1* | 8/2014 | Ishitsuka | ............ | H04N 5/23216 348/333.12 |
| 2016/0323513 A1* | 11/2016 | Takahashi | .......... | H04N 5/23293 |

(Continued)

FOREIGN PATENT DOCUMENTS

JP 2008-211630 A 9/2008

*Primary Examiner* — Albert H Cutler
(74) *Attorney, Agent, or Firm* — Cowan, Liebowitz & Latman, P.C.

(57) ABSTRACT

An image sensing apparatus, comprising: an image sensor to capture an image; a display to display a full screen image and a display controlling unit to switch an image to be displayed by the display between an enlarged image and the full screen image; and a control unit to perform, in accordance with a predetermined operation, a first setting for determining a setting parameter of the image sensor in a first state and a second setting for determining a predetermined range of the live view image in a second state, wherein when the predetermined operation is performed while the display displays the enlarged image, the display controlling unit does not switch the image displayed to the full screen image, and the control unit performs the first setting if the display is in the first state, and performs the second setting if the display is in the second state.

8 Claims, 12 Drawing Sheets

| | | ENLARGEMENT STATE | | |
|---|---|---|---|---|
| | | FULL SCREEN (NON-SCALED) | ENLARGED (×5) | ENLARGED (×10) |
| SETTING STATE | NORMAL | STATE A | STATE B | STATE C |
| | FRAME SETTING | STATE D | STATE E | STATE F |

(56) References Cited

U.S. PATENT DOCUMENTS

2017/0064188 A1* 3/2017 Yoshida ............. H04N 5/23212
2018/0109722 A1* 4/2018 Laroia ................ H04N 5/23229

* cited by examiner

Fig.3A

| SETTING STATE | ENLARGEMENT STATE | | |
|---|---|---|---|
| | FULL SCREEN (NON-SCALED) | ENLARGED (×5) | ENLARGED (×10) |
| NORMAL | STATE A | STATE B | STATE C |
| FRAME SETTING | STATE D | STATE E | STATE F |

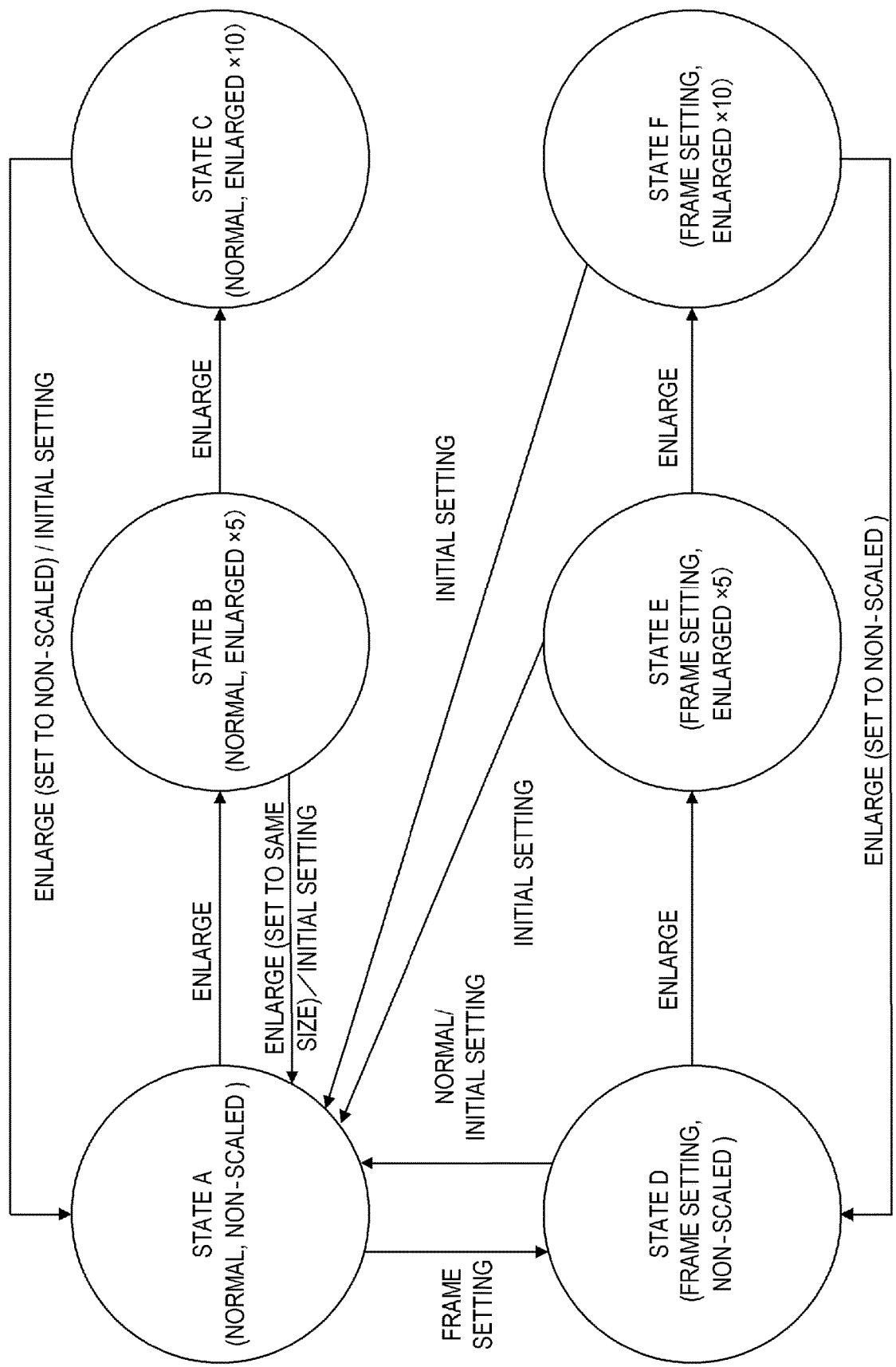

Fig.5

| STATE / OPERATION | STATE A | STATE B | STATE C | STATE D | STATE E | STATE F |
|---|---|---|---|---|---|---|
| DIAL OPERATION | SET EXPOSURE (Tv, Av) | | | MOVE AF FRAME/ ENLARGEMENT FRAME (COARSE) | | |
| | S1102 | S2102 | | S3102 | S4102 | |
| CROSS KEYS OPERATION | INVOKE BUTTON CUSTOMIZATION | | | MOVE AF FRAME/ ENLARGEMENT FRAME (FINE) | | |
| | S1104 | S2104 | | S3104 | S4104 | |
| TOUCH FRAME MOVEMENT OPERATION | MOVE AF FRAME/ ENLARGEMENT FRAME | | | | | |
| | S1106 | S2106 | | S3106 | S4106 | |
| OPERATION WITH RESPECT TO OTHER MEMBERS | EXECUTE ASSIGNED PROCESS | | | | | |
| | S1108 | S2108 | | S3108 | S4108 | |

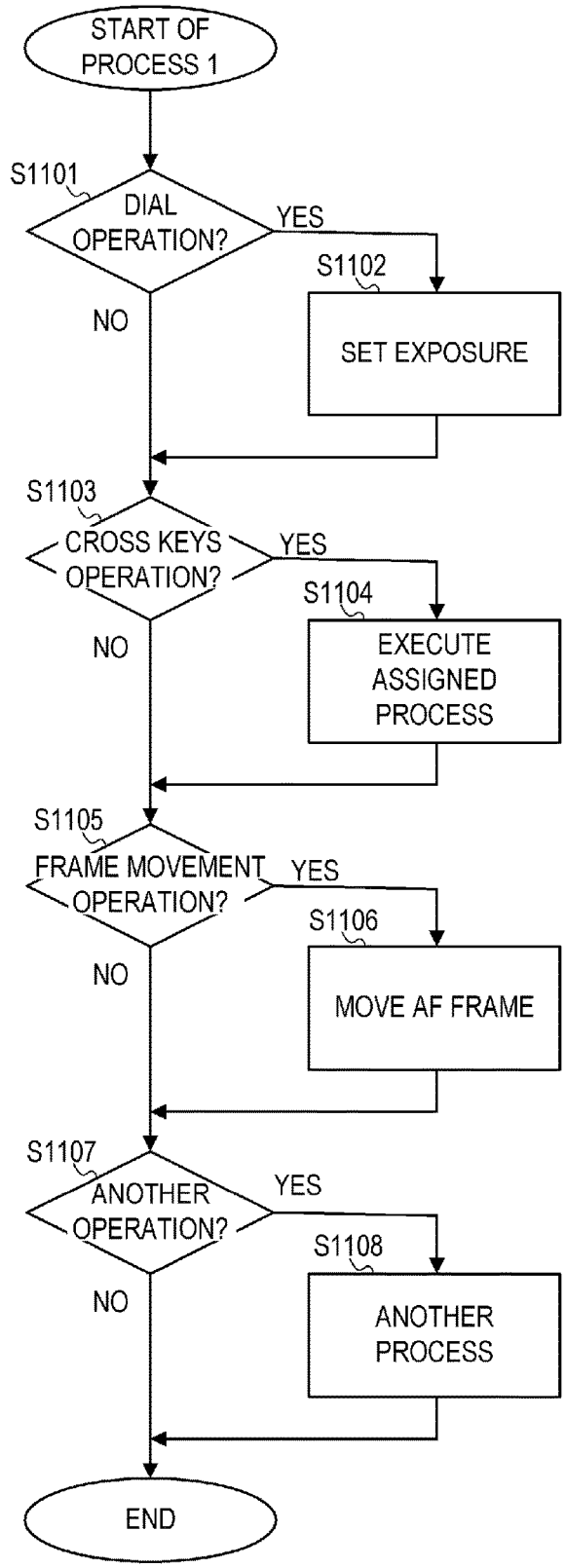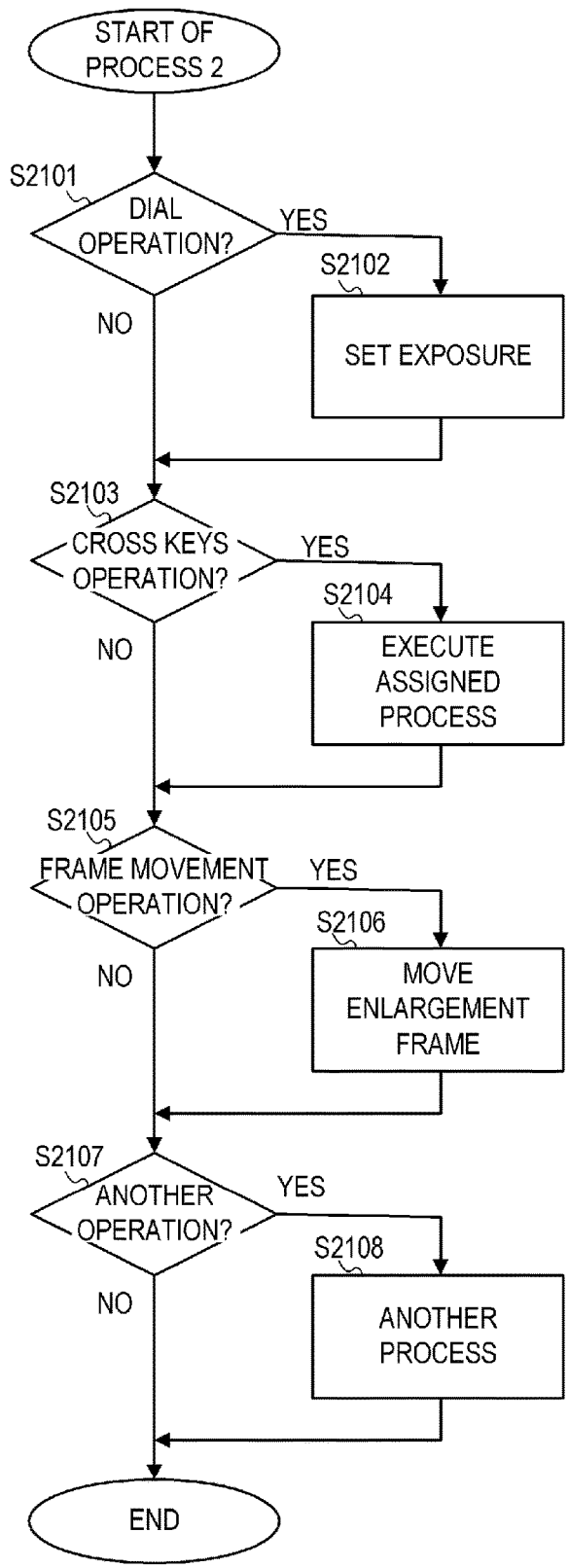

IMAGE SENSING APPARATUS WITH IMPROVED USER OPERABILITY WHEN PERFORMING AN ENLARGED DISPLAY OF A LIVE VIEW IMAGE AND CONTROL METHOD OF IMAGE SENSING APPARATUS

BACKGROUND OF THE INVENTION

Field of the Invention

The present invention relates to an image sensing apparatus and a control method of an image sensing apparatus.

Description of the Related Art

Conventionally, in a state where a live view image (a subject image) is enlarged and displayed on an electronic view finder that is a display mounted on a digital camera or the like or a thin film transistor (TFT) liquid crystal display, a user can perform photography using the digital camera. Therefore, the user can readily check focus with respect to a subject and the like and take a moving image or a picture as intended.

In addition, techniques for improving user operability in a state where such an enlarged display of a live view image is being performed include a technique described in Japanese Patent Application Laid-open No. 2008-211630. Japanese Patent Application Laid-open No. 2008-211630 describes an image sensing apparatus which, when an instruction to change a position of an enlarged range is issued during an enlarged display of a live view image, moves the enlarged range while maintaining a state of enlarged display of the live view image.

SUMMARY OF THE INVENTION

However, the image sensing apparatus according to Japanese Patent Application Laid-open No. 2008-211630 is only capable of changing the enlarged range of a live view image, and photographing parameters (setting parameters) such as exposure and ISO sensitivity cannot be set during an enlarged display of the live view image. Therefore, conventionally, in order to set a photographing parameter during the enlarged display of a live view image, since the user must first temporarily cancel (abort) the enlarged display, there is a problem of bad user operability during the enlarged display of a live view image.

In consideration thereof, an object of the present invention is to provide an image sensing apparatus capable of improving user operability when performing an enlarged display of a live view image.

A first aspect of the present invention is an image sensing apparatus, comprising:
an image sensor configured to capture an image;
a display configured to display a full screen image that represents an entire range of a live view image captured by the image sensor; and
a memory and at least one processor and/or at least one circuit to perform the operations of the following units:
a display controlling unit configured to switch an image to be displayed by the display between an enlarged image that represents a partial range of the live view image and the full screen image; and
a control unit configured to perform, in accordance with a predetermined operation that is an operation other than an operation to the display, (1) a first setting for determining a setting parameter of the image sensor in a first state and (2) a second setting for determining a predetermined range of the live view image in a second state,
wherein in a case where the predetermined operation is performed while the display displays the enlarged image, (A) the display controlling unit does not switch the image displayed by the display to the full screen image, and (B) the control unit (B1) performs the first setting if the display is in the first state, and (B2) performs the second setting if the display is in the second state.

A second aspect of the present invention is a control method of an image sensing apparatus including an image sensor to capture an image and a display to display a full screen image that represents an entire range of a live view image captured by the image sensor, the control method comprising:
a display control step of switching an image to be displayed by the display between an enlarged image that represents a partial range of the live view image and the full screen image; and
a control step of performing, in accordance with a predetermined operation that is an operation other than an operation to the display, (1) a first setting for determining a setting parameter of the image sensor in a first state and (2) a second setting for determining a predetermined range of the live view image in a second state,
wherein in a case where the predetermined operation is performed while the display displays the enlarged image, (A) in the display control step, the image displayed by the display is not switched to the full screen image, and (B) in the control step, (B1) the first setting is performed if the display is in the first state, and (B2) the second setting is performed if the display is in the second state.

According to the present invention, user operability when performing an enlarged display of a live view image can be improved.

Further features of the present invention will become apparent from the following description of exemplary embodiments with reference to the attached drawings.

BRIEF DESCRIPTION OF THE DRAWINGS

FIGS. 3A and 3B are diagrams showing states of the digital camera according to the first embodiment;
FIG. 5 is a diagram showing processes in accordance with user operations according to the first embodiment;
FIGS. 7A to 7D are flow charts showing processes in accordance with user operations according to the first embodiment.

DESCRIPTION OF THE EMBODIMENTS

First Embodiment
External View of Digital Camera 100

Figure 1A:
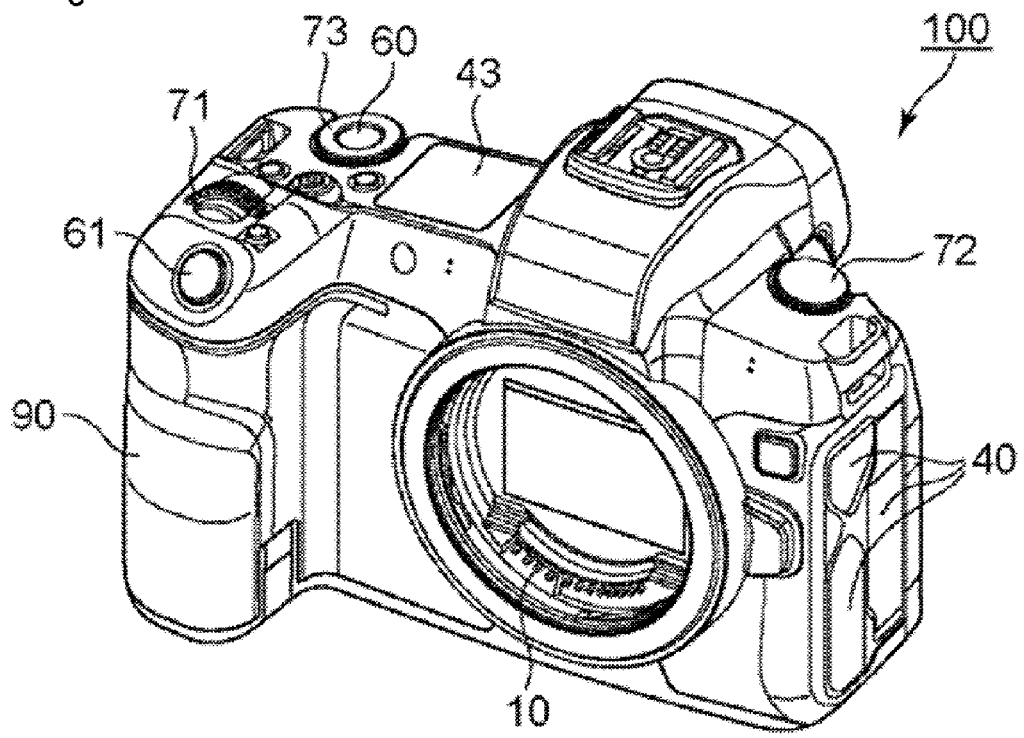
FIGS. 1A and 1B are external views of a digital camera according to a first embodiment.
Figure 1B:
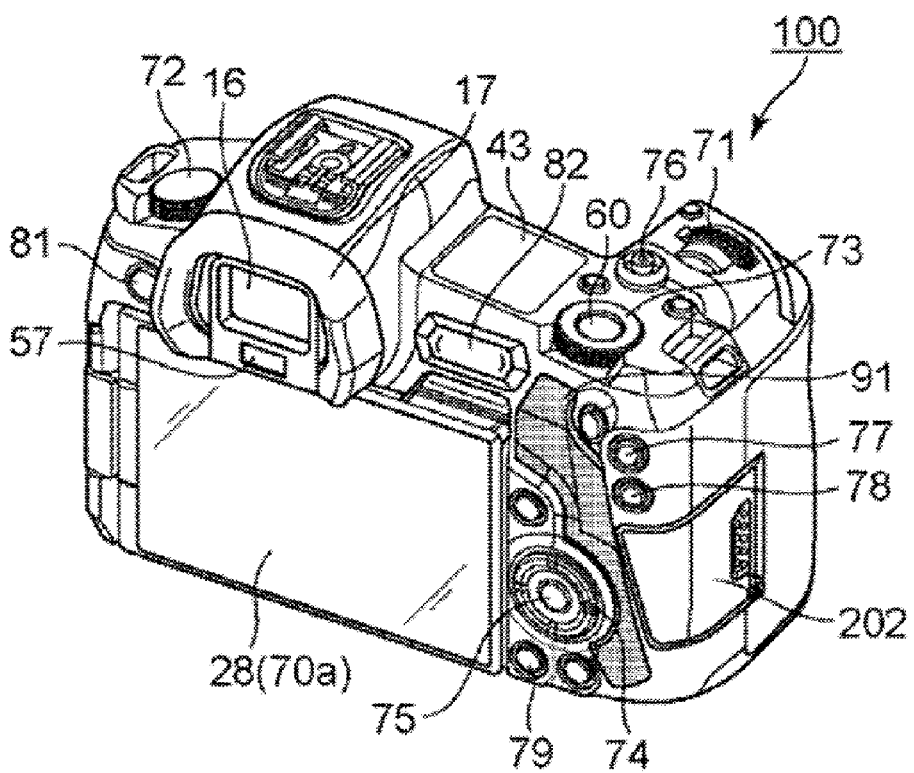

Hereinafter, a preferred embodiment of the present invention will be described with reference to the drawings. FIGS. 1A and 1B show external views of a digital camera 100 as an example of an apparatus to which the present invention can be applied. FIG. 1A is a front perspective view of the digital camera 100, and FIG. 1B is a rear perspective view of the digital camera 100.

A display 28 (display unit) is a display provided on a rear surface of the digital camera 100 for displaying images and various types of information. A touch panel 70a is capable of detecting touch operations with respect to a display surface (a touch operation surface) of the display 28. A finder outer display 43 is a display provided on an upper surface of the digital camera 100 for displaying various setting values of the digital camera 100 including shutter speed and aperture. A shutter button 61 is an operation member for issuing a photograph instruction. A mode changeover switch 60 is an operating member for switching between various modes. A terminal cover 40 is a cover for protecting a connector (not illustrated) to which is connected a connection cable or the like for connecting the digital camera 100 to an external device.

A main electronic dial 71 is a rotating operating member and, by turning the main electronic dial 71, setting values such as shutter speed and aperture can be changed. A power switch 72 is an operation member for switching power of the digital camera 100 on and off. A sub electronic dial 73 is a rotating operation member and, by turning the sub electronic dial 73, operations such as moving a selection frame (cursor) and image feeding can be performed. Cross keys 74 are configured such that upper, lower, left, and right portions thereof are respectively depressible, and enables a process corresponding to a depressed portion of the cross keys 74 to be performed. A SET button 75 is a push button mainly used to determine a selected item.

A moving image button 76 is used to issue instructions to start or stop moving image photography (recording). An AE lock button 77 is a push button, and by depressing the AE lock button 77 in a photography standby state, an exposure state can be fixed. An enlargement button 78 is an operation button for switching an enlargement mode on and off in a live view display (LV display) in a photography mode. By operating the main electronic dial 71 after switching on the enlargement mode, a live view image (LV image) can be enlarged or reduced. In a playback mode, the enlargement button 78 functions as an operation button for enlarging a reproduced image or increasing an enlargement rate of the reproduced image. A playback button 79 is an operation button for switching between the photography mode and the playback mode. By depressing the playback button 79 in the photography mode, a transition can be made to the playback mode and a latest image among images recorded in a recording medium 200 (to be described later) can be displayed on the display 28. A menu button 81 is a push button used for performing an instruction operation to display a menu screen and, when the menu button 81 is depressed, a menu screen enabling various settings to be performed is displayed on the display 28. The user can intuitively perform various settings using the menu screen displayed on the display 28 together with the cross keys 74 and the SET button 75.

A touch bar 82 (multi-function bar: M-Fn bar) is a linear touch operation member (line touch sensor) capable of accepting a touch operation. The touch bar 82 is arranged at a position where a touch operation can be performed on the touch bar 82 (where the touch bar 82 is touchable) by the thumb of a right hand gripping a grip unit 90 in a normal grip (a grip recommended by a manufacturer). The touch bar 82 is an accepting unit capable of accepting a tap operation (an operation involving touching and releasing without movement within a predetermined period of time), leftward and rightward slide operations (operations involving touching and moving a touch position while maintaining the touch), and the like with respect to the touch bar 82. The touch bar 82 is an operation member that differs from the touch panel 70a and is not equipped with a display function.

A communication terminal 10 is a communication terminal used by the digital camera 100 to communicate with a lens unit 150 (to be described later; attachable and detachable). An eyepiece 16 is an eyepiece of an eyepiece finder 17 (a look-in finder), and the user can visually confirm, via the eyepiece 16, an image displayed on an internal EVF 29 (to be described later). An eye proximity detecting unit 57 is an eye proximity detection sensor that detects whether or not the user (photographer) is approaching the eyepiece 16. A lid 202 is a lid of a slot in which the recording medium 200 (to be described later) is stored. The grip unit 90 is a holding unit configured in a shape that can be readily gripped by the user when holding the digital camera 100. The shutter button 61 and the main electronic dial 71 are arranged at positions where the shutter button 61 and the main electronic dial 71 can be operated by the index finger of the right hand in a state where the digital camera 100 is held by gripping the grip unit 90 with the little finger, the ring finger, and the middle finger of the right hand. In addition, the sub electronic dial 73 and the touch bar 82 are arranged at positions where the sub electronic dial 73 and the touch bar 82 can be operated by the right thumb in a same state. A thumb rest unit 91 (a thumb standby position) is a grip member provided at a location where the thumb of the right hand gripping the grip unit 90 can be readily placed on a rear side of the digital camera 100 in a state where none of the operation members are being operated. The thumb rest unit 91 is constituted by a rubber member or the like in order to enhance holding force (grip feeling).

Configuration Block Diagram of Digital Camera 100

Figure 2:
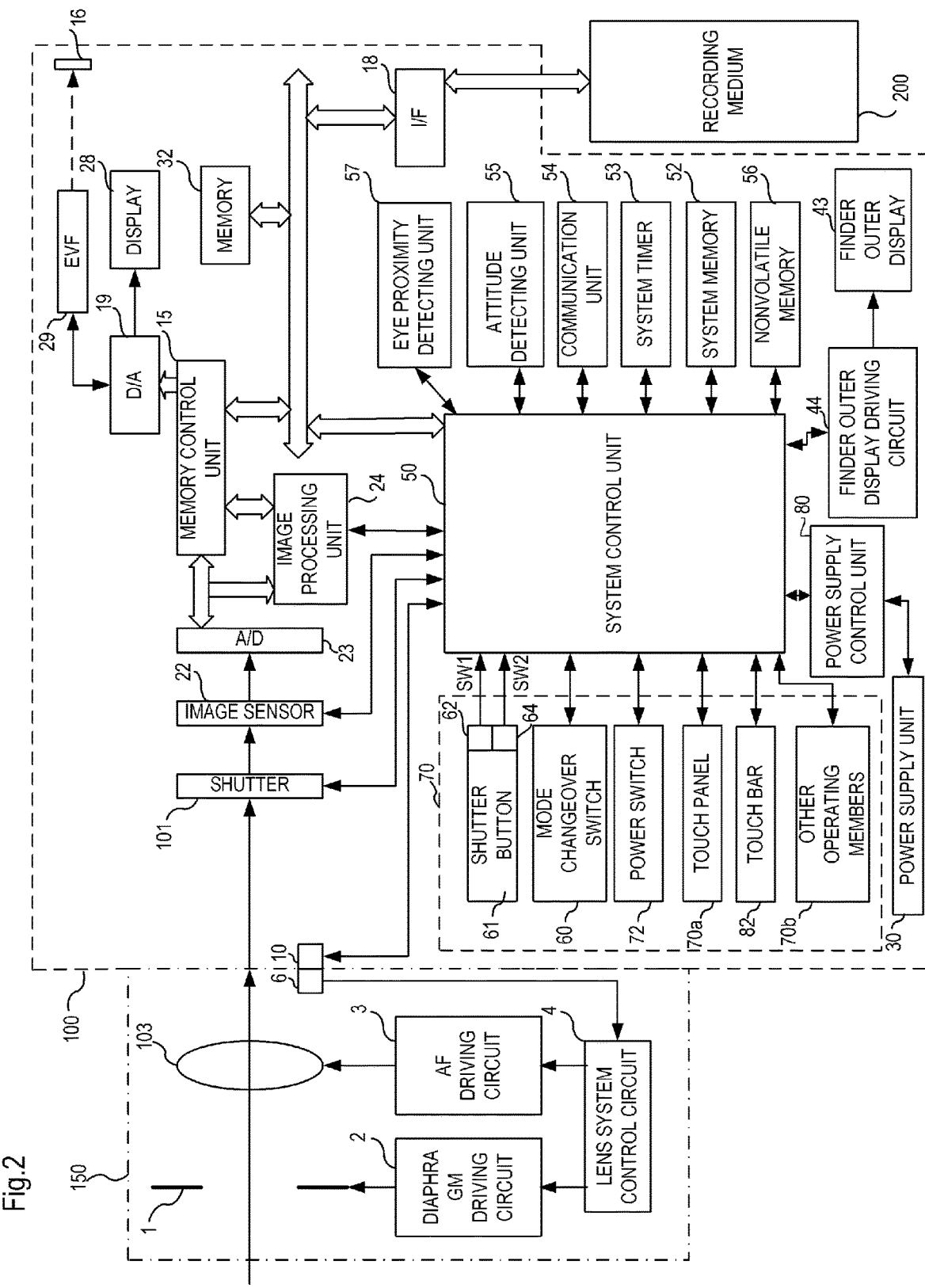
FIG. 2 is a configuration diagram of the digital camera according to the first embodiment.

FIG. 2 is a block diagram showing a configuration example of the digital camera 100. The lens unit 150 is a lens unit mounted with a replaceable photographing lens. While a lens 103 is usually configured by a plurality of lenses, in FIG. 2, the lens 103 is shown simplified with only one lens. A communication terminal 6 is a communication terminal used by the lens unit 150 to communicate with the digital camera 100, and the communication terminal 10 is a communication terminal used by the digital camera 100 to communicate with the lens unit 150. The lens unit 150 communicates with the system control unit 50 via the communication terminals 6 and 10. In addition, the lens unit 150 controls a diaphragm 1 via a diaphragm driving circuit 2 using an internal lens system control circuit 4. Furthermore, the lens unit 150 performs focusing by displacing a position of the lens 103 via an AF driving circuit 3 using the lens system control circuit 4.

A shutter 101 is a focal plane shutter capable of freely controlling an exposure time of an image sensor 22 under the control of the system control unit 50.

The image sensor 22 is an image sensing element constituted by a device such as a CCD or a CMOS which converts an optical image into an electrical signal. The image sensor 22 may have an image sensing surface phase difference sensor that outputs information on a defocusing amount to the system control unit 50. An A/D converter 23 converts an analog signal output from the image sensor 22 into a digital signal.

An image processing unit 24 performs predetermined processes (pixel interpolation, a resizing process such as reduction, a color conversion process, and the like) on data from the A/D converter 23 or data from a memory control unit 15. In addition, the image processing unit 24 performs a predetermined arithmetic process using image data of a captured image, and the system control unit 50 performs exposure control and ranging control based on an arithmetic result obtained by the image processing unit 24. Accordingly, processes such as an automatic focusing (AF) process, an automatic exposure (AE) process, and a preliminary light emission before flash (EF) process in a through-the-lens (TTL) system are performed. The image processing unit 24 further performs a predetermined arithmetic process using image data of a captured image and performs an automatic white balance (AWB) process in the TTL system based on an obtained arithmetic result.

Output data from the A/D converter 23 is written into a memory 32 via the image processing unit 24 and the memory control unit 15. Alternatively, output data from the A/D converter 23 is written into the memory 32 via the memory control unit 15 without involving the image processing unit 24. The memory 32 stores image data obtained by the image sensor 22 and converted into digital data by the A/D converter 23 and image data to be displayed on the display 28 and the EVF 29. The memory 32 has sufficient storage capacity for storing a predetermined number of still images and a predetermined time's worth of moving images and audio.

In addition, the memory 32 also doubles as a memory (a video memory) for image display. A D/A converter 19 converts data for image display stored in the memory 32 into an analog signal and supplies the analog signal to the display 28 and the EVF 29. In this manner, image data for display having been written into the memory 32 is displayed by the display 28 and the EVF 29 via the D/A converter 19. The display 28 and the EVF 29 each perform display in accordance with an analog signal from the D/A converter 19 on a display such as an LCD, an organic EL, or the like. A live view display (LV) can be performed by converting digital signals subjected to A/D conversion by the A/D converter 23 and accumulated in the memory 32 into analog signals with the D/A converter 19, and sequentially transmitting and displaying the analog signals to the display 28 or the EVF 29. Hereinafter, an image displayed in a live view display will be referred to as a live view image (LV image).

Various setting values of the camera including a shutter speed and an aperture are displayed on the finder outer display 43 via a finder outer display driving circuit 44.

A nonvolatile memory 56 is an electrically erasable and recordable memory and is, for example, an EEPROM. Constants, a program, and the like for operations of the system control unit 50 are recorded in the nonvolatile memory 56. In this case, the program refers to a program for executing the various flow charts to be described later in the present embodiment.

The system control unit 50 is a control unit constituted by at least one processor or one circuit and controls the entire digital camera 100. The system control unit 50 realizes the respective processes of the present embodiment (to be described later) by executing the program recorded in the nonvolatile memory 56 described earlier. A system memory 52 is, for example, a RAM, and the system control unit 50 deploys constants and variables for the operations of the system control unit 50, the program read from the nonvolatile memory 56, and the like on the system memory 52. In addition, the system control unit 50 also performs display control by controlling the memory 32, the D/A converter 19, the display 28, and the like.

A system timer 53 is a time-measuring unit for measuring time used in various controls and for measuring time according to an internal clock.

A power supply control unit 80 is constituted by a battery detection circuit, a DC-DC converter, a switching circuit for switching between blocks to be energized, and the like, and detects whether or not a battery is mounted, a type of the battery, a remaining battery level, and the like. In addition, the power supply control unit 80 controls the DC-DC converter based on the detection results and an instruction from the system control unit 50 and supplies respective units including the recording medium 200 with necessary voltage for a necessary period of time. A power supply unit 30 is constituted by a primary battery such as an alkaline battery or a lithium battery, a secondary battery such as a NiCd battery, a NiMH battery, or a Li battery, an AC adapter, or the like.

A recording medium I/F 18 is an interface with the recording medium 200 that is a memory card, a hard disk, or the like. The recording medium 200 is a recording medium such as a memory card for recording photographed images and is constituted by a semiconductor memory, a magnetic disk, or the like.

A communication unit 54 transmits and receives video signals and audio signals to and from an external device connected wirelessly or by a wired cable. The communication unit 54 is also capable of connecting to a wireless local area network (LAN) or the Internet. In addition, the communication unit 54 is also capable of communicating with the external device via Bluetooth™ or Bluetooth Low Energy. The communication unit 54 is capable of transmitting images (including LV images) captured by the image sensor 22 and images recorded on the recording medium 200 and receiving image data and various other types of information from the external device.

An attitude detecting unit 55 detects an attitude of the digital camera 100 relative to a direction of gravitational force. Based on the attitude detected by the attitude detecting unit 55, a determination can be made as to whether an image photographed by the image sensor 22 is an image photographed while holding the digital camera 100 horizontally or an image photographed while holding the digital camera 100 vertically. The system control unit 50 can add orientation information in accordance with the attitude detected by the attitude detecting unit 55 to an image file of the image captured by the image sensor 22 and record a rotated version of the image. An acceleration sensor, a gyro sensor, or the like can be used as the attitude detecting unit 55. A motion (panned, tilted, uplifted, whether stationary or not, and the like) of the digital camera 100 can also be detected using the acceleration sensor or the gyro sensor that constitutes the attitude detecting unit 55.

The eye proximity detecting unit 57 is an eye proximity detection sensor which detects (approach detection) an approach (eye approach) and a separation (eye separation) of an eye (object) with respect to the eyepiece 16 of the eyepiece finder 17 (hereinafter, simply referred to as a "finder"). The system control unit 50 switches between setting the display 28 and the EVF 29 to display (displayed state) and hide (hidden state) in accordance with the state detected by the eye proximity detecting unit 57. More specifically, at least when a current state is the photography standby state and when switching of a display destination is to be performed automatically, the display 28 as the display destination is set to display and the EVF 29 is set to hide when unapproached by the eye. In addition, during an eye approach, the EVF 29 as the display destination is set to display and the display 28 is set to hide. As the eye proximity detecting unit 57, for example, an infrared proximity sensor can be used to detect an approach of any object with respect to the eyepiece 16 of the finder 17 incorporating the EVF 29. When an object approaches, infrared light projected from a light projecting unit (not illustrated) of the eye proximity detecting unit 57 is reflected by the object and received by a light receiving unit (not illustrated) of the infrared proximity sensor. Based on an amount of received infrared light, how close the object is from the eyepiece 16 (eye proximity distance) can also be determined. In this manner, the eye proximity detecting unit 57 performs eye proximity detection in which a distance of approach by an object with respect to the eyepiece 16 is detected. An eye approach is to be detected when an object having approached the eyepiece 16 to within a predetermined distance from an eye-unapproached state (unapproached state) is detected. An eye separation is to be detected when an object of which an approach has been detected recedes to a predetermined distance or more from an eye-approached state (approached state) is detected. A threshold for detecting an eye approach and a threshold for detecting an eye separation may differ from each other by, for example, providing a hysteresis. In addition, after detecting an eye approach, an eye-approached state is assumed until an eye separation is detected. After detecting an eye separation, an eye-unapproached state is assumed until an eye approach is detected. It should be noted that an infrared proximity sensor is simply an example and other sensors may be adopted as the eye proximity detecting unit 57 as long as an approach by an eye or an object which can be regarded as an eye approach can be detected.

An operating unit 70 is an input unit for accepting an operation (a user operation) by the user and is used to input various operation instructions to the system control unit 50. As shown in FIG. 2, the operating unit 70 includes the mode changeover switch 60, the shutter button 61, the power switch 72, the touch panel 70a, and the touch bar 82. As other operation members 70b, the operating unit 70 includes the main electronic dial 71, the sub electronic dial 73, the cross keys 74, the SET button 75, the moving image button 76, the AE lock button 77, the enlargement button 78, the playback button 79, and the menu button 81.

The mode changeover switch 60 switches an operating mode of the system control unit 50 to any of a still image photography mode, a moving image photography mode, a playback mode, and the like. Modes included in the still image photography mode are an automatic photography mode, an automatic scene determination mode, a manual mode, an aperture priority mode (Av mode), a shutter speed priority mode (Tv mode), and a program AE mode (P mode). Other available modes include various scene modes that constitute photography settings for different photography scenes as well as custom modes. Using the mode changeover switch 60, the user can directly switch to any of these modes. Alternatively, after temporarily switching to a photography mode list screen using the mode changeover switch 60, another operating member may be used to selectively switch to any of a plurality of displayed modes. In a similar manner, the moving image photography mode may also include a plurality of modes.

The shutter button 61 includes a first shutter switch 62 and a second shutter switch 64. The first shutter switch 62 is turned on during an operation of the shutter button 61 by a so-called half-press (photography preparation instruction) and generates a first shutter switch signal SW1. In accordance with the first shutter switch signal SW1, the system control unit 50 starts a photography preparation operation of an automatic focusing (AF) process, an automatic exposure (AE) process, an automatic white balance (AWB) process, a preliminary light emission before flash (EF) process, and the like. The second shutter switch 64 is turned on upon completion of an operation of the shutter button 61 by a so-called full-press (photography instruction) and generates a second shutter switch signal SW2. In accordance with the second shutter switch signal SW2, the system control unit 50 starts a series of operations of a photography process from reading a signal from the image sensor 22 to writing a captured image into the recording medium 200 as an image file.

The touch panel 70a and the display 28 can be integrally constructed. For example, the touch panel 70a is configured such that transmittance of light does not obstruct display by the display 28 and is mounted to an upper layer of a display surface of the display 28. Subsequently, an input coordinate on the touch panel 70a and a display coordinate on the display surface of the display 28 are associated with each other. Accordingly, a graphical user interface (GUI) can be provided which enables the user to feel as if a screen displayed on the display 28 can be directly manipulated. The system control unit 50 is capable of detecting the following operations with respect to the touch panel 70a or the following states of the touch panel 70a.

A new touch on the touch panel 70a by a finger or a stylus previously not in touch with the touch panel 70a or, in other words, a start of a touch (hereinafter referred to as a touch-down)

A state where the touch panel 70a is being touched by a finger or a stylus (hereinafter referred to as a touch-on)

A state where a finger or a stylus is moving while in touch with the touch panel 70a (hereinafter referred to as a touch-move)

A separation (release) from the touch panel 70a by a finger or a stylus having been in touch with the touch panel 70a or, in other words, an end of a touch (hereinafter referred to as a touch-up)

A state where nothing is touching the touch panel 70a (hereinafter referred to as a touch-off)

When a touch-down is detected, a touch-on is simultaneously detected. Normally, after a touch-down, a touch-on is continuously detected unless a touch-up is detected. When a touch-move is detected, a touch-on is similarly simultaneously detected. Even when a touch-on is detected, a touch-move is not detected unless a touch position moves. A touch-off occurs after a touch-up is detected for all of the fingers or a stylus previously in touch.

The system control unit 50 is notified of the operations and states described above as well as a position coordinate where a finger or a stylus touches the touch panel 70a through an internal bus. In addition, based on the notified information, the system control unit 50 determines what kind of operation (touch operation) has been performed on the touch panel 70a. With respect to a touch-move, a movement direction of a finger or a stylus moving on the touch panel 70a can be determined for each of a vertical component and a horizontal component on the touch panel 70a based on a change in the position coordinate. When a touch-move of a predetermined distance or more is detected, it is determined that a slide operation has been performed. An operation involving quickly moving a finger on the touch panel 70a for a certain distance while keeping the finger in touch with the touch panel 70a and then releasing the finger is referred to as a flick. In other words, a flick is an operation in which a finger quickly traces the touch panel 70a as though flicking on the touch panel 70a. A determination that a flick has been performed can be made (a determination that a flick has occurred following a slide operation can be made) when a detection of a touch-move of a predetermined distance or more at a predetermined speed or more is followed by a detection of a touch-up. Furthermore, a touch operation involving touching (multi-touching) a plurality of locations (for example, two points) at the same time and bringing the respective touch positions close to each other is referred to as a pinch-in while a touch operation in which the respective touch positions are distanced from each other is referred to as a pinch-out. A pinch-out and a pinch-in are collectively referred to as a pinch operation (or, simply, a pinch). The touch panel 70a may adopt any touch panel system among various systems including a resistive film system, a capacitance system, a surface acoustic wave system, an infrared system, an electromagnetic induction system, an image recognition system, and an optical sensor system. Any of a system in which a touch is detected when contact is made with the touch panel and a system in which a touch is detected when a finger or a stylus approaches the touch panel may be adopted.

States of Digital Camera

With the digital camera 100 that is an image sensing apparatus according to the present embodiment, even when a live view image is enlarged and displayed on the display 28, exposure or the like for photography can be set without canceling the enlarged display as long as the digital camera 100 is in a state (a first state) for setting exposure or the like. In addition, even when a live view image is enlarged and displayed on the display 28, a target range of automatic focusing (AF) can be set without canceling the enlarged display as long as the digital camera 100 is in a state (a second state) for setting the AF target range. Accordingly, since photographing parameters (setting parameters) such as exposure for photography can be set in accordance with a state of the digital camera 100 even during an enlarged display of a live view image, user operability is improved.

In this case, a live view image refers to an image which is generated by the system control unit 50 by controlling the image sensor 22 and which displays a present state of a subject that is an object of photography (image sensing). In addition, exposure refers to an amount of light incident to the digital camera 100. It should be noted that, while a digital camera is used as an image sensing apparatus in the present embodiment, a smartphone or a tablet terminal, a PC, a control apparatus for controlling a digital camera, or the like may be used as long as a live view image can be acquired.

As described above, since settings that can be implemented vary depending on a state of the digital camera 100, hereinafter, states of the digital camera 100 according to the present embodiment will be first described with reference to FIG. 3A. States of the digital camera 100 according to the present embodiment can be classified into six states on the basis of two setting states and three enlargement states.

Specifically, setting states include the two states of "normal" and "frame setting". When the setting state is "normal", the digital camera 100 mainly enables setting parameters (setting values) related to exposure and photography to be set (determined), and when the setting state is "frame setting", the digital camera 100 mainly enables an AF frame or an enlargement frame to be set (determined). In addition, enlargement states include the three states of: "full screen (non-scaled)" in which an entire range of a live view image (a full screen image) is displayed on the display 28; "enlarged ×5" in which the live view image is enlarged by a factor of 5 and displayed; and "enlarged ×10" in which the live view image is enlarged by a factor of 10 and displayed. In other words, when the enlargement state is "enlarged ×5" or "enlarged ×10", a partial range (an enlarged image) of the live view image is displayed on the display 28. Furthermore, an AF frame refers to a frame indicating a ranging range (point) where automatic focusing is being performed. An enlargement frame refers to an AF frame indicating a range of focus detection during an enlarged display.

While magnification is set to 5 times or 10 times in the present embodiment, it should be noted that selectable magnifications differ among models of the digital camera 100, an arbitrary magnification may suffice. In addition, while the digital camera 100 can be set to a plurality of magnifications (5 times and 10 times) in the present embodiment, for example, the digital camera 100 can be configured so that only one magnification (for example, 5 times) can be set.

Hereinafter, the six states of the digital camera 100 described above will be given the following correspondences and will be referred to and described as states A to F.

In the state A, the setting state is "normal" and the enlargement state is "full screen".

In the state B, the setting state is "normal" and the enlargement state is "enlarged ×5".

In the state C, the setting state is "normal" and the enlargement state is "enlarged ×10".

In the state D, the setting state is "frame setting" and the enlargement state is "full screen".

In the state E, the setting state is "frame setting" and the enlargement state is "enlarged ×5".

In the state F, the setting state is "frame setting" and the enlargement state is "enlarged ×10".

Display Example on Display in Each State

Hereinafter, examples of screens (images) displayed on the display 28 in each of the states A to F described above will be described with reference to FIGS. 4A to 4F. FIGS. 4A to 4F are, respectively, diagrams showing a screen example (display example) on the display 28 (the touch panel 70a) corresponding to the states A to F. The display 28 (the touch panel 70a) includes an AF frame 301 in the states A and D and includes an enlargement frame 307 and an enlargement indicator 311 in the states B, C, E, and F. In addition, in the states A to C, the touch panel 70a has touch buttons 302 to 306 mainly as touch buttons for setting exposure. In the states D to F, the touch panel 70a has touch buttons 308 to 310. Since these touch buttons accept operations from the user, the touch buttons can be considered operating units.

The AF frame 301 is a frame that indicates a range of focus detection (an automatic focusing object).

The touch button 302 is a button that is touched (tapped) when changing magnification (enlargement state).

The touch button 303 is a button that is touched (tapped) when changing shutter speed (Tv value) which is one exposure setting.

The touch button 304 is a button that is touched (tapped) when changing an aperture value (Av value) which is one exposure setting.

The touch button 305 is a button that is touched (tapped) when changing a correction value for correcting (setting) exposure.

The touch button 306 is a button that is touched (tapped) when changing a value of ISO sensitivity.

The enlargement frame 307 is an AF frame indicating a range of focus detection during enlargement.

The touch button 308 is a button that is touched (tapped) when arranging the AF frame at a center of a live view image.

The touch button 309 is a button that is touched (tapped) when changing magnification (enlargement state).

The touch button 310 is a button that is touched (tapped) when changing the setting state of the digital camera 100 from "frame setting" to "normal".

The enlargement indicator 311 indicates a region enlarged and displayed on the display 28 with respect to a photographed image. Specifically, in the enlargement indicator 311, an outer peripheral frame indicates an entire region of the photographed image and a region painted black indicates a position and a size currently being enlarged. It should be noted that, while magnification is displayed on the enlargement indicator 311, the magnification is also displayed on the finder outer display 43.

Figure 4A:
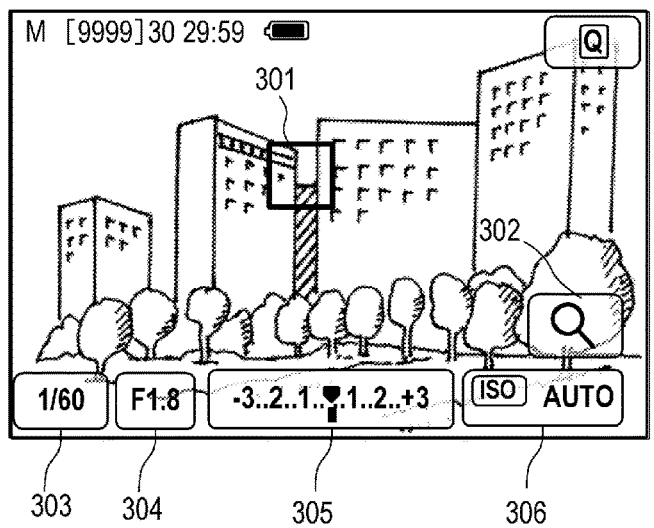
FIGS. 4A to 4F represent screen display examples in accordance with states of the digital camera according to the first embodiment.
Figure 4B:
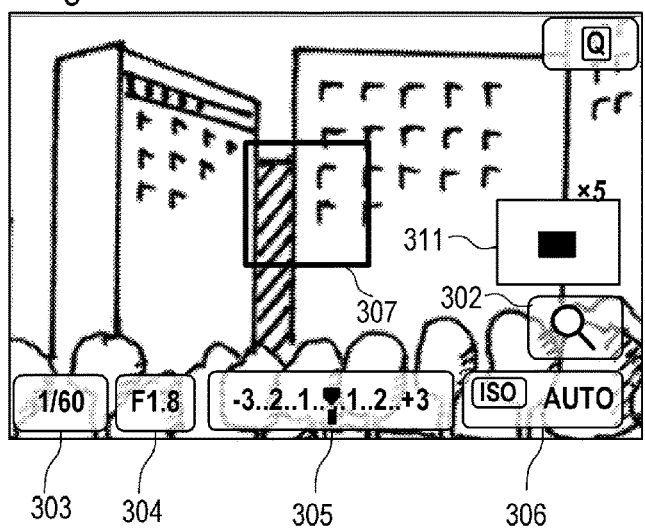
Figure 4C:
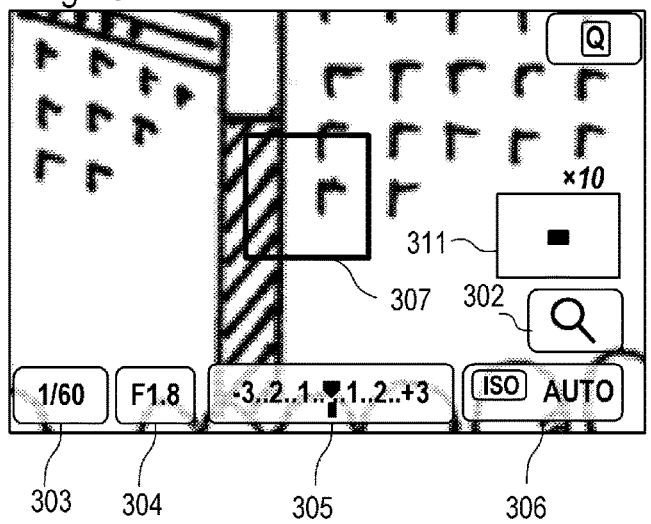
Figure 4D:
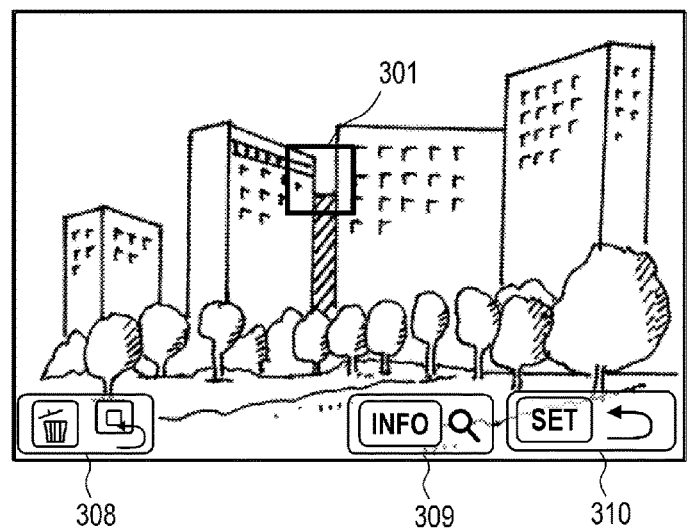
Figure 4E:
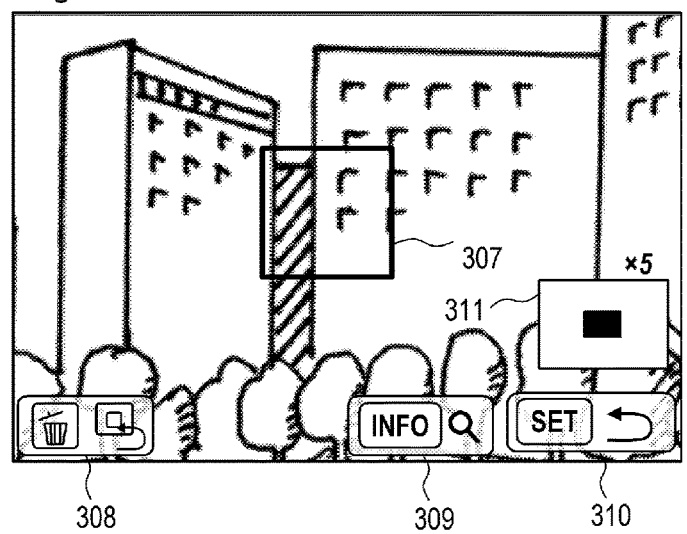
Figure 4F:
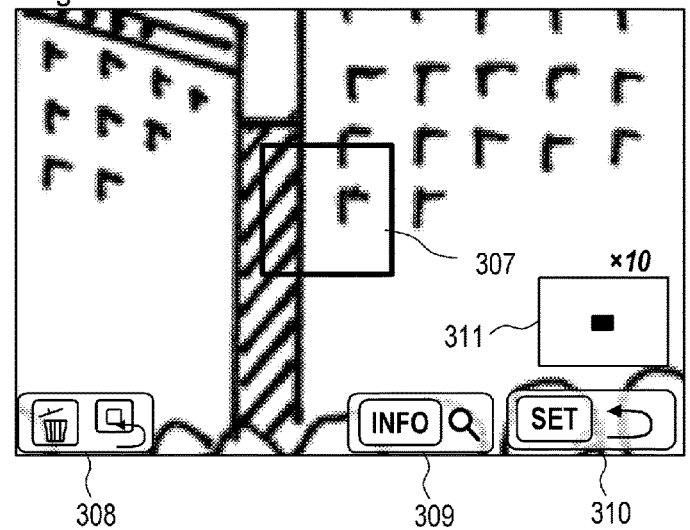

In the present embodiment, it is assumed that an operation for changing the setting state of the digital camera 100 from "normal" to "frame setting" is performed when an operation with respect to the operating unit 70 other than the touch panel 70a is performed. However, an operation for changing the setting state of the digital camera 100 from "normal" to "frame setting" is not limited thereto and the touch panel 70a may include a touch button for changing the setting state of the digital camera 100 from "normal" to "frame setting". Alternatively, the setting state of the digital camera 100 may be changed from "normal" to "frame setting" when the user taps the AF frame 301. In addition, based on the description given above, the state (the first state) where the setting state of the digital camera 100 is "normal" may be described as a state where a touch button for setting exposure is displayed on the display 28 as shown in FIGS. 4A to 4C. On the other hand, the state (the second state) where the setting state of the digital camera 100 is "frame setting" may be described as a state where a touch button for setting exposure is not displayed on the display 28 as shown in FIGS. 4D to 4F.

State Transition of Each State

Hereinafter, state transitions in accordance with operations with respect to the operating unit 70 of the digital camera 100 according to the present embodiment will be described with reference to FIG. 3B.

In the state A, when an operation (an enlargement operation) for changing a magnification of a live view image is performed with respect to the operating unit 70, a transition is made to the state B. It should be noted that, when an enlargement operation is performed in the present embodiment, the system control unit 50 changes the enlargement state to "enlarged ×5" if the enlargement state is "full screen", changes the enlargement state to "enlarged ×10" if the enlargement state is "enlarged ×5", and changes the enlargement state to "full screen" if the enlargement state is "enlarged ×10". However, these changes are not restrictive and the system control unit 50 may be configured so as to be capable of changing the enlargement state to an arbitrary enlargement state in accordance with a user operation.

In the state A, when an operation for changing the setting state to "frame setting" is performed with respect to the operating unit 70, a transition is made to the state D.

In the state B, when an enlargement operation is performed with respect to the operating unit 70, a transition is made to the state C.

In the state C, when an enlargement operation is performed with respect to the operating unit 70, a transition is made to the state A.

In the states B and C, when an operation for changing the setting state to "normal" and, at the same time, changing the enlargement state to "full screen" (an operation for restoring initial settings) is performed with respect to the operating unit 70, a transition is made to the state A.

In the state D, when an enlargement operation is performed with respect to the operating unit 70, a transition is made to the state E.

In the state D, when an operation for changing the setting state to "normal" is performed with respect to the operating unit 70, a transition is made to the state A.

In the state E, when an enlargement operation is performed with respect to the operating unit 70, a transition is made to the state F.

In the state F, when an enlargement operation is performed with respect to the operating unit 70, a transition is made to the state D.

In the states D, E, and F, when an operation for changing the setting state to "normal" and, at the same time, changing the enlargement state to "full screen" (an operation for restoring initial settings) is performed with respect to the operating unit 70, a transition is made to the state A.

Processes in Accordance with Operations with Respect to Operating Portion

Hereinafter, processes performed by the system control unit 50 in accordance with an operation with respect to each operating unit 70 in each of the cases where the digital camera 100 is in the states A to F will be described with reference to FIG. 5.

In the states A to C, as described below, the system control unit 50 mainly performs processes in accordance with each of five operations.

A user operation (a dial operation) involving rotating a dial such as the main electronic dial 71 or the sub electronic dial 73 causes the system control unit 50 to set exposure by changing setting values such as the Tv value and the Av value.

A user operation with respect to the cross keys 74 causes the system control unit 50 to execute a process (setting) assigned to each button of the cross keys 74 (directional pad).

A touch operation with respect to the AF frame or the enlargement frame included in the touch panel 70a causes the system control unit 50 to execute a process of moving a frame position.

A touch operation with respect to touch buttons included in the touch panel 70a causes the system control unit 50 to execute a process assigned to each touch button as described above.

An operation other than the four operations described above causes the system control unit 50 to execute a process in accordance with the operation.

In the states D to F, as described below, the system control unit 50 mainly performs processes in accordance with each of five operations.

A dial operation with respect to the main electronic dial 71 or the sub electronic dial 73 causes the system control unit 50 to execute a process (setting) of moving a frame position with a first granularity.

A user operation with respect to the cross keys 74 causes the system control unit 50 to execute a process (setting) of moving a frame position with a granularity that is finer than the first granularity.

A touch operation with respect to the AF frame or the enlargement frame included in the touch panel 70a causes the system control unit 50 to execute a process of moving a frame position.

A touch operation with respect to touch buttons included in the touch panel 70a causes the system control unit 50 to execute a process assigned to each touch button as described above.

An operation other than the four operations described above causes the system control unit 50 to execute a process in accordance with the operation.

It should be noted that a moving process of a frame position corresponding to a touch operation may be in accordance with a slide with respect to the touch panel 70a or the like, or the AF frame of the touch panel 70a may be tapped and a position other than the AF frame may be subsequently tapped in order to move the AF frame to the position. In other words, a moving process of a frame position corresponding to a touch operation may be performed in accordance with any operation as long as the operation accompanies a touch with respect to the touch panel 70a. Parameters that can be changed by a dial operation with respect to the main electronic dial 71 or the sub electronic dial 73 are not limited to exposure and may be any setting parameter for performing photography such as an ISO setting value or an F value.

As described above, processes executed by the system control unit 50 in accordance with the two operations of a dial operation with respect to the main electronic dial 71 or the sub electronic dial 73 and a user operation with respect to the cross keys 74 differ depending on a setting state of the digital camera 100. Therefore, even when an enlarged live view image is being displayed on the display 28, the user can perform settings in accordance with a setting state of the digital camera 100. In addition, when the setting state of the digital camera 100 is "normal", the user can set exposure as well as move the AF frame or the enlargement frame without using the touch panel 70a. Therefore, when the setting state of the digital camera 100 is "normal", the user can move the AF frame or the enlargement frame without causing a transition of the setting state to "frame setting". As described above, in the present embodiment, the system control unit 50 can be considered a control unit for setting exposure and moving the AF frame and, at the same time, a display controlling unit for switching between enlarged display and full-screen display of a live view image. It should be noted that, as described above, depending on a touch operation with respect to the touch panel 70a, the system control unit 50 can move the AF frame (the enlargement frame) in both setting states of "normal" and "frame setting".

In addition, based on the description given above, the state (the first state) where the setting state of the digital camera 100 is "normal" may be described as a state where exposure can be set by an operation other than an operation with respect to the display 28 (the touch panel 70a). On the other hand, the state (the second state) where the setting state of the digital camera 100 is "frame setting" may be described as a state where the AF frame can be moved (set) by an operation other than an operation with respect to the display 28 (the touch panel 70a).

Photography Process

Figure 6A:
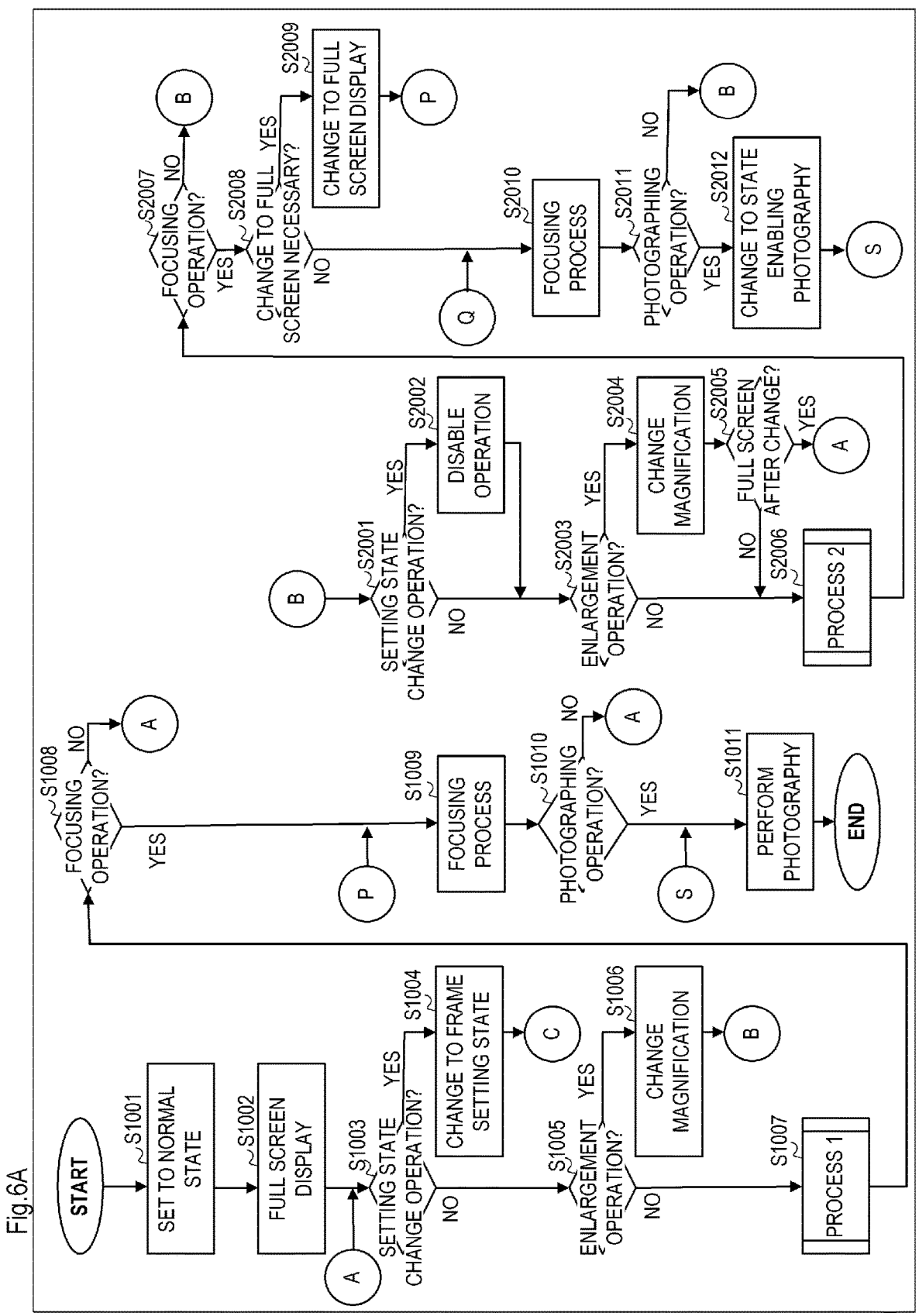
FIG. 6A is a flow chart of a photographing process according to the first embodiment.
Figure 6B:
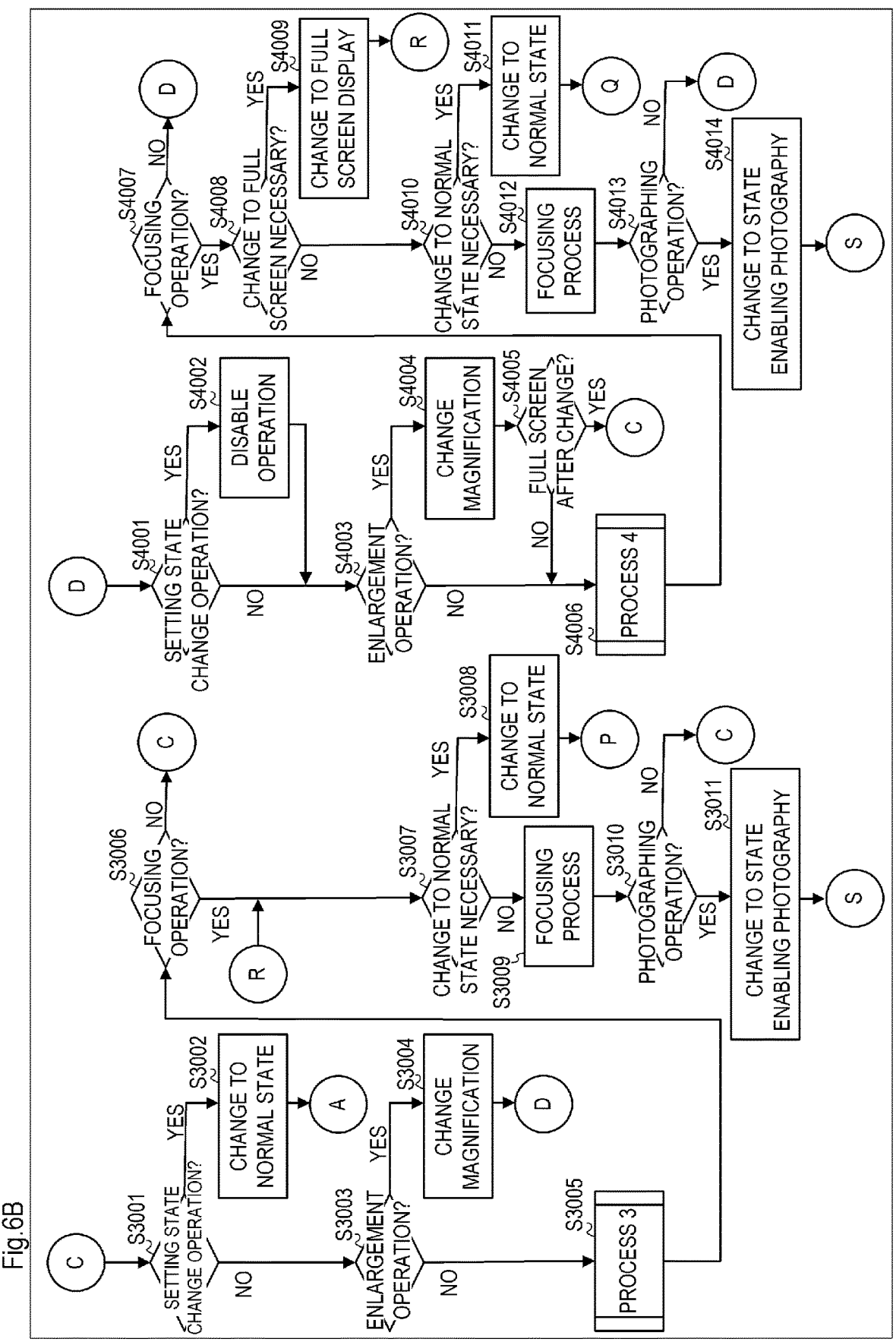
FIG. 6B is a flow chart of a photographing process according to the first embodiment.

FIGS. 6A and 6B are flow charts showing a series of processes culminating with completion of a photography process of a subject which is performed by the digital camera 100 according to the present embodiment. FIG. 6A shows processes of S1001 to S1011 in the state A and processes of S2001 to S2012 in the state B or the state C. FIG. 6B shows processes of S3001 to S3011 in the state D and processes of S4001 to S4014 in the state E or the state F. Each process in the flow charts shown in FIGS. 6A and 6B is realized as the system control unit 50 deploys a program stored in the nonvolatile memory 56 onto the system memory 52 and executes the program. It should be noted that these processes are started when power of the digital camera 100 is turned on and a transition is made to a state where a live view image is displayed on the display 28.

Processes in State A

In S1001, the system control unit 50 sets the setting state of the digital camera 100 to "normal".

In S1002, the system control unit 50 sets the enlargement state to "full screen" and performs a full screen display of a live view image on the display 28.

In S1003, the system control unit 50 determines whether or not an operation for changing the setting state to "frame setting" has been performed with respect to the operating unit 70. When an operation for changing the setting state to "frame setting" has been performed, a transition is made to S1004, but if not, a transition is made to S1005.

In S1004, the system control unit 50 changes the setting state of the digital camera 100 to "frame setting". When the process of S1004 is finished, the process flow makes a transition to S3001.

In S1005, the system control unit 50 determines whether or not an operation for changing magnification (an enlargement operation) has been performed with respect to the operating unit 70. When an enlargement operation has been performed, a transition is made to S1006, but when an enlargement operation has not been performed, a transition is made to S1007.

In S1006, the system control unit 50 performs control so as to change the magnification of the live view image displayed on the display 28. Since the enlargement state at a time point of starting this process flow is "full screen", the system control unit 50 changes the enlargement state to "enlarged ×5". The process flow then makes a transition to S2001.

In S1007, the system control unit 50 executes a process 1 to be described later.

In S1008, the system control unit 50 determines whether or not a focusing operation for bringing a subject into focus such as an operation with respect to the first shutter switch 62 (an operation for generating SW1) has been performed. When a focusing operation has been performed, a transition is made to S1009, but when a focusing operation has not been performed, a transition is made to S1003. In other words, since the present flow chart represents a flow until photography is performed, processes in the present flow chart are repeated until photography is performed. It should be noted that, when MF (manual focusing) in which a focusing operation is not performed is set or during photography that does not accompany a focusing operation, a transition is made from S1007 to S1010 without performing the processes of S1008 and S1009.

In S1009, the system control unit 50 performs a focusing process that is a process of bringing the subject into focus and adjusts the focus of the live view image with respect to the subject.

In S1010, the system control unit 50 determines whether or not a photographing operation has been performed by an operation with respect to the second shutter switch 64 (an operation for generating SW2). When a photographing operation has been performed, a transition is made to S1011, but when a photographing operation has not been performed, a transition is made to S1003. However, during a period in which the shutter button 61 is being half-depressed (the first shutter switch 62 is depressed) without performing a photographing operation, the system control unit 50 repetitively performs the determination in S1010. The repetitive determination during a period in which the shutter button 61 is being half-depressed similarly applies to S2011, S3010, and S4013 to be described later.

In S1011, the system control unit 50 performs a photographing process by controlling the image sensor 22 and the like.

Processes in State B or State C

In S2001, the system control unit 50 determines whether or not an operation for setting the setting state to "frame setting" has been performed with respect to the operating unit 70. When an operation for setting the setting state to "frame setting" has been performed, a transition is made to S2002, but when an operation for setting the setting state to "frame setting" has not been performed, a transition is made to S2003.

In S2002, the system control unit 50 does not perform any process even when an operation for setting "frame setting" is performed. In other words, the system control unit 50 performs control that disables an operation for setting "frame setting". This is because, in the present embodiment, a transition from the state B or C to the state E or F by a user operation is not allowed. In this manner, by preventing the setting state from changing in accordance with a user operation while a live view image is being enlarged and displayed, an erroneous operation by the user during the enlarged display can be suppressed.

In S2003, the system control unit 50 determines whether or not an operation for changing magnification (an enlargement operation) of the live view image has been performed with respect to the operating unit 70. When an enlargement operation has been performed, a transition is made to S2004, but when an enlargement operation has not been performed, a transition is made to S2006.

In S2004, the system control unit 50 performs control so as to change the magnification of the live view image displayed on the display 28. Since the enlargement state at a time point of starting this process flow is "enlarged ×5" or "enlarged ×10", the system control unit 50 changes the enlargement state to "enlarged ×10" when the enlargement state is "enlarged ×5" and changes the enlargement state to "full screen" when the enlargement state is "enlarged ×10".

In S2005, the system control unit 50 determines whether or not the enlargement state of the live view image has been changed to "full screen" after the process of S2004. When a change has been made to "full screen", a transition is made to S1003, but when a change has not been made to "full screen", a transition is made to S2006.

In S2006, the system control unit 50 executes a process 2 to be described later.

In S2007, the system control unit 50 determines whether or not a focusing operation that is an operation with respect to the first shutter switch 62 or the like has been performed. When a focusing operation has been performed, a transition is made to S2008, but when a focusing operation has not been performed, a transition is made to S2001. It should be noted that, during MF setting in which a focusing operation is not performed or during photography that does not accompany a focusing operation, a transition is made from S2006 to S2011 without performing the processes of S2007 to S2010.

In S2008, the system control unit 50 determines whether or not a full screen display of the live view image needs to be performed on the display 28 when performing a focusing process. In other words, this determination takes into consideration the fact that, depending on a model of the digital camera 100, a focusing process cannot be performed in a state where the live view image is being enlarged and displayed on the display 28. When full screen display needs to be performed, a transition is made to S2009, but when full screen display need not be performed, a transition is made to S2010.

In S2009, the system control unit 50 sets the enlargement state to "full screen" and performs control so as perform a full screen display of the live view image on the display 28. When the process of S2009 is finished, the process flow makes a transition to S1009.

In S2010, the system control unit 50 performs a focusing process and adjusts the focus of the live view image with respect to the subject.

In S2011, the system control unit 50 determines whether or not a photographing operation that is an operation with respect to the second shutter switch 64 has been performed. When a photographing operation has been performed, a transition is made to S1011, but when a photographing operation has not been performed, a transition is made to S2001.

In S2012, the system control unit 50 places the digital camera 100 in a state where photography can be performed. When the process of S2012 is finished, the process flow makes a transition to S1011. It should be noted that, while the state where photography can be performed may be an arbitrary state, in the present embodiment, the state is assumed to be an initial state or, in other words, the state A where the setting state is "normal" and the enlargement state is "full screen". In other words, this process is executed in consideration of the fact that, depending on a model of the digital camera 100, a photographing process cannot be performed in a state where the live view image is being enlarged and displayed on the display 28 or when the setting state is "frame setting".

Processes in State D

In S3001, the system control unit 50 determines whether or not an operation for setting the setting state to "normal" has been performed with respect to the operating unit 70. When an operation for setting the setting state to "normal" has been performed, a transition is made to S3002, but when an operation for setting the setting state to "normal" has not been performed, a transition is made to S3003.

In S3002, the system control unit 50 changes the setting state of the digital camera 100 to "normal". When the process of S3002 is finished, the process flow makes a transition to S1003.

In S3003, the system control unit 50 determines whether or not an enlargement operation has been performed with respect to the operating unit 70. When an enlargement operation has been performed, a transition is made to S3004, but when an enlargement operation has not been performed, a transition is made to S3005.

In S3004, the system control unit 50 performs control so as to change the magnification of the live view image displayed on the display 28. Since the enlargement state at a time point of starting this process flow is "full screen", the system control unit 50 changes the enlargement state to "enlarged ×5". When the process of S3004 is finished, the process flow makes a transition to S4001.

In S3005, the system control unit 50 executes a process 3 to be described later.

In S3006, the system control unit 50 determines whether or not a focusing operation that is an operation with respect to the first shutter switch 62 or the like has been performed. When a focusing operation has been performed, a transition is made to S3007, but when a focusing operation has not been performed, a transition is made to S3001.

In S3007, the system control unit 50 determines whether or not the setting state of the camera needs to be changed from "frame setting" to "normal" when performing a focusing process. When the setting state needs to be changed from "frame setting" to "normal", a transition is made to S3008, but when the setting state need not be changed from "frame setting" to "normal", a transition is made to S3009. In other words, this process is executed in consideration of the fact that, depending on a model of the digital camera 100, a focusing process cannot be performed when the setting state is "frame setting".

In S3008, the system control unit 50 sets the setting state of the digital camera 100 to "normal". When the process of S3008 is finished, the process flow makes a transition to S1009.

In S3009, the system control unit 50 performs a focusing process.

In S3010, the system control unit 50 determines whether or not a photographing operation that is an operation with respect to the second shutter switch 64 has been performed. When a photographing operation has been performed, a transition is made to S3011, but when a photographing operation has not been performed, a transition is made to S3001.

In S3011, the system control unit 50 places the digital camera 100 in a state where photography can be performed. When the process of S2011 is finished, the process flow makes a transition to S1011.

Processes in State E or State F

In S4001, the system control unit 50 determines whether or not an operation for setting the setting state to "normal" has been performed with respect to the operating unit 70. When an operation for setting the setting state to "normal" has been performed, a transition is made to S4002, but when an operation for setting the setting state to "normal" has not been performed, a transition is made to S4003.

In S4002, the system control unit 50 does not perform any process even when an operation for setting the setting state to "normal" is performed. In other words, the system control unit 50 performs control that disables an operation for setting the setting state to "normal". This is because, in the present embodiment, a transition from the state E or F to the state B or C by a user operation is not allowed.

In S4003, the system control unit 50 determines whether or not an enlargement operation has been performed with respect to the operating unit 70. When an enlargement operation has been performed, a transition is made to S4004, but when an enlargement operation has not been performed, a transition is made to S4006.

In S4004, the system control unit 50 performs control so as to change the magnification of the live view image displayed on the display 28. Since the enlargement state at a time point of starting this process flow is "enlarged ×5" or "enlarged ×10", the system control unit 50 changes the enlargement state to "enlarged ×10" when the enlargement state is "enlarged ×5" and changes the enlargement state to "full screen" when the enlargement state is "enlarged ×10".

In S4005, the system control unit 50 determines whether or not the enlargement state of the live view image has been changed to "full screen" after the process of S4004. When a change has been made to "full screen", a transition is made to S3001, but when a change has not been made to "full screen", a transition is made to S4006.

In S4006, the system control unit 50 executes a process 4 to be described later.

In S4007, the system control unit 50 determines whether or not a focusing operation that is an operation with respect to the first shutter switch 62 or the like has been performed. When a focusing operation has been performed, a transition is made to S4008, but when a focusing operation has not been performed, a transition is made to S4001.

In S4008, the system control unit 50 determines whether or not a full screen display of the live view image needs to be performed on the display 28 when performing a focusing process. When full screen display needs to be performed, a transition is made to S4009, but when full screen display need not be performed, a transition is made to S4010.

In S4009, the system control unit 50 sets the enlargement state to "full screen" and performs control so as perform a full screen display of the live view image on the display 28. In addition, the process flow makes a transition to S3007.

In S4010, the system control unit 50 determines whether or not the setting state of the camera needs to be changed from "frame setting" to "normal" when performing a focusing process. When the setting state needs to be changed, a transition is made to S4011, but when the setting state need not be changed, a transition is made to S4012.

In S4011, the system control unit 50 sets the setting state of the digital camera 100 to "normal". In addition, when the process of S4011 is finished, the process flow makes a transition to S2010. In other words, in this case, a transition from the state E or F to the state B or C is permitted as an exception in order to perform a focusing process. It should be noted that, in S4011, the system control unit 50 may further change the enlargement state to "full screen" and the process flow may make a transition to S1009.

In S4012, the system control unit 50 performs a focusing process.

In S4013, the system control unit 50 determines whether or not a photographing operation that is an operation with respect to the second shutter switch 64 has been performed. When a photographing operation has been performed, a transition is made to S4014, but when a photographing operation has not been performed, a transition is made to S4001.

In S4014, the system control unit 50 places the digital camera 100 in a state where photography can be performed. When the process of S4014 is finished, the process flow makes a transition to S1011.

Process 1 in State A

Hereinafter, details of the process 1 mentioned earlier will be described with reference to the flow chart shown in FIG. 7A.

In S1101, the system control unit 50 determines whether or not a dial operation with respect to the main electronic dial 71 or the sub electronic dial 73 has been performed. When a dial operation with respect to the main electronic dial 71 or the sub electronic dial 73 has been performed, a transition is made to S1102, but when a dial operation with respect to the main electronic dial 71 or the sub electronic dial 73 has not been performed, a transition is made to S1103.

In S1102, the system control unit 50 changes exposure that is a camera setting of the digital camera 100. For example, the system control unit 50 changes (sets) the Tv value in accordance with a dial operation with respect to the main electronic dial 71 and changes the Av value in accordance with a dial operation with respect to the sub electronic dial 73. For example, a configuration may be adopted in which items that can be set such as the Av value and the Tv value differ depending on a mode (a state) of the digital camera 100.

In S1103, the system control unit 50 determines whether or not an operation with respect to the cross keys 74 has been performed. When an operation with respect to the cross keys 74 has been performed, a transition is made to S1104, but when an operation with respect to the cross keys 74 has not been performed, a transition is made to S1105.

In S1104, the system control unit 50 executes a process assigned in advance to each direction of the cross keys 74. For example, the system control unit 50 reduces the Tv value when a left key is depressed and increases the Tv value when a right key is depressed. The system control unit 50 performs a process arbitrarily set by the user by key customization with respect to each key.

In S1105, the system control unit 50 determines whether or not a touch operation with respect to the touch panel 70a has been performed. When a touch operation has been performed, a transition is made to S1106, but when a touch operation has not been performed, a transition is made to S1107.

In S1106, the system control unit 50 moves a frame position of the AF frame in accordance with the touch operation. In the present embodiment, it is assumed that the AF frame is moved in accordance with a movement amount of a touch position.

In S1107, the system control unit 50 determines whether or not another operation has been performed. In this case, another operation refers to an operation with respect to the operating unit 70 other than the operations performed by the user in S1101, S1103, and S1105. When another operation has been performed, a transition is made to S1108, but when another operation has not been performed, the process 1 is ended.

In S1108, the system control unit 50 executes a process assigned to each operating unit.

Process 2 in State B or State C

The process 2 described above is performed as indicated by the flow chart shown in FIG. 7B. Since each of S2101 to S2108 in the process 2 is a process that is similar to a case where the term "AF frame" is replaced with the term "enlargement frame" in the process of each of S1101 to S1108 in the process 1, a detailed description of the processes will be omitted. In other words, the system control unit 50 is able to set exposure without having to switch the live view image displayed by the display 28 to a full screen display.

Process 3 in State D

Figure 7C:
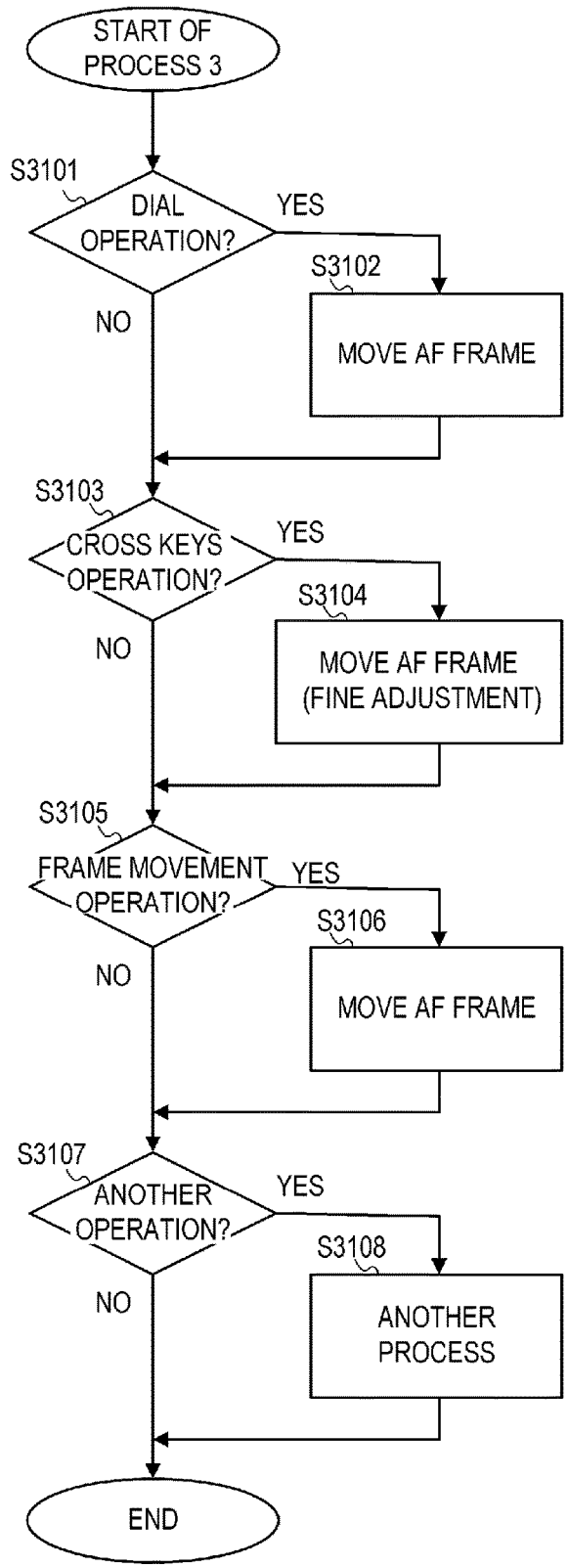

Hereinafter, details of the process 3 mentioned earlier will be described with reference to the flow chart shown in FIG. 7C. Since each process of S3105 to S3108 is similar to each process of S1105 to S1108 in the process 1, a detailed description of the processes will be omitted.

In S3101, the system control unit 50 determines whether or not a dial operation with respect to the main electronic dial 71 or the sub electronic dial 73 has been performed. When a dial operation with respect to the main electronic dial 71 or the sub electronic dial 73 has been performed, a transition is made to S3102, but when a dial operation with respect to the main electronic dial 71 or the sub electronic dial 73 has not been performed, a transition is made to S3103.

In S3102, the system control unit 50 moves a frame position of the AF frame in accordance with an operation amount (an amount of rotation) of the dial operation.

In S3103, the system control unit 50 determines whether or not an operation with respect to the cross keys 74 has been performed. When an operation with respect to the cross keys 74 has been performed, a transition is made to S3104, but when an operation with respect to the cross keys 74 has not been performed, a transition is made to S3105.

In S3104, the system control unit 50 moves a frame position of the AF frame in accordance with an operation with respect to each of the cross keys included in the cross keys 74. In this case, finer positional adjustment can be performed when moving the frame position of the AF frame in accordance with an operation with respect to the cross keys 74 than when moving the frame position of the AF frame in accordance with a dial operation in S3102. Specifically, for example, a smallest unit of a movement amount of the AF frame in accordance with an operation with respect to the cross keys 74 is set smaller than a smallest unit of a movement amount of the AF frame in accordance with a dial operation.

Process 4 in State E or State F

Figure 7D:
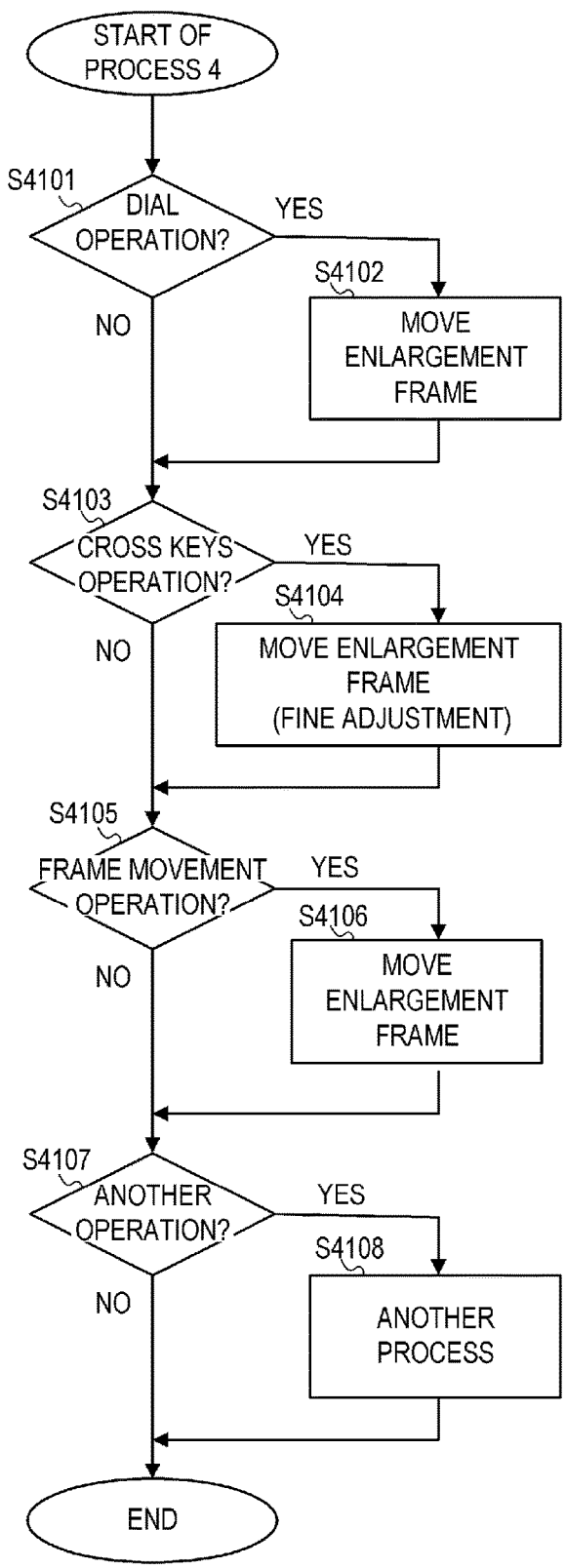

The process 4 described above is performed as indicated by the flow chart shown in FIG. 7D. Since each of S4101 to S4108 in the process 4 is a process that is similar to a case where the term "AF frame" is replaced with the term "enlargement frame" in the process of each of S3101 to S3108 in the process 3, a detailed description of the processes will be omitted. In other words, the system control unit 50 is able to move (set) the enlargement frame (the AF frame) without having to switch the live view image displayed by the display 28 to a full screen display.

Effects

As described above, according to the present embodiment, even when a live view image is being enlarged and displayed on the display, settings in accordance with a setting state of the digital camera can be performed. Therefore, since the user need not set exposure or the AF frame after canceling the enlarged display, settings for photography of the digital camera can be readily performed with favorable operability. In addition, the user can set, while maintaining the state of enlarged display, a setting item that had been settable prior to making a transition to a state of enlarging a live view image on the display even after the enlarged display of the live view image. Specifically, even when a live view image is being enlarged and displayed on the display, exposure can be set in one step by a dial operation when in a predetermined state and the AF frame can be moved in one step by the same dial operation when in another state. As a result, even when a digital camera only includes a small number of operation members, operability can be improved.

First Modification

While transitions between the state B or the state C and the state E or the state F are not permitted in the first embodiment, a case where such transitions are permitted will be described in a first modification.

Figure 8:
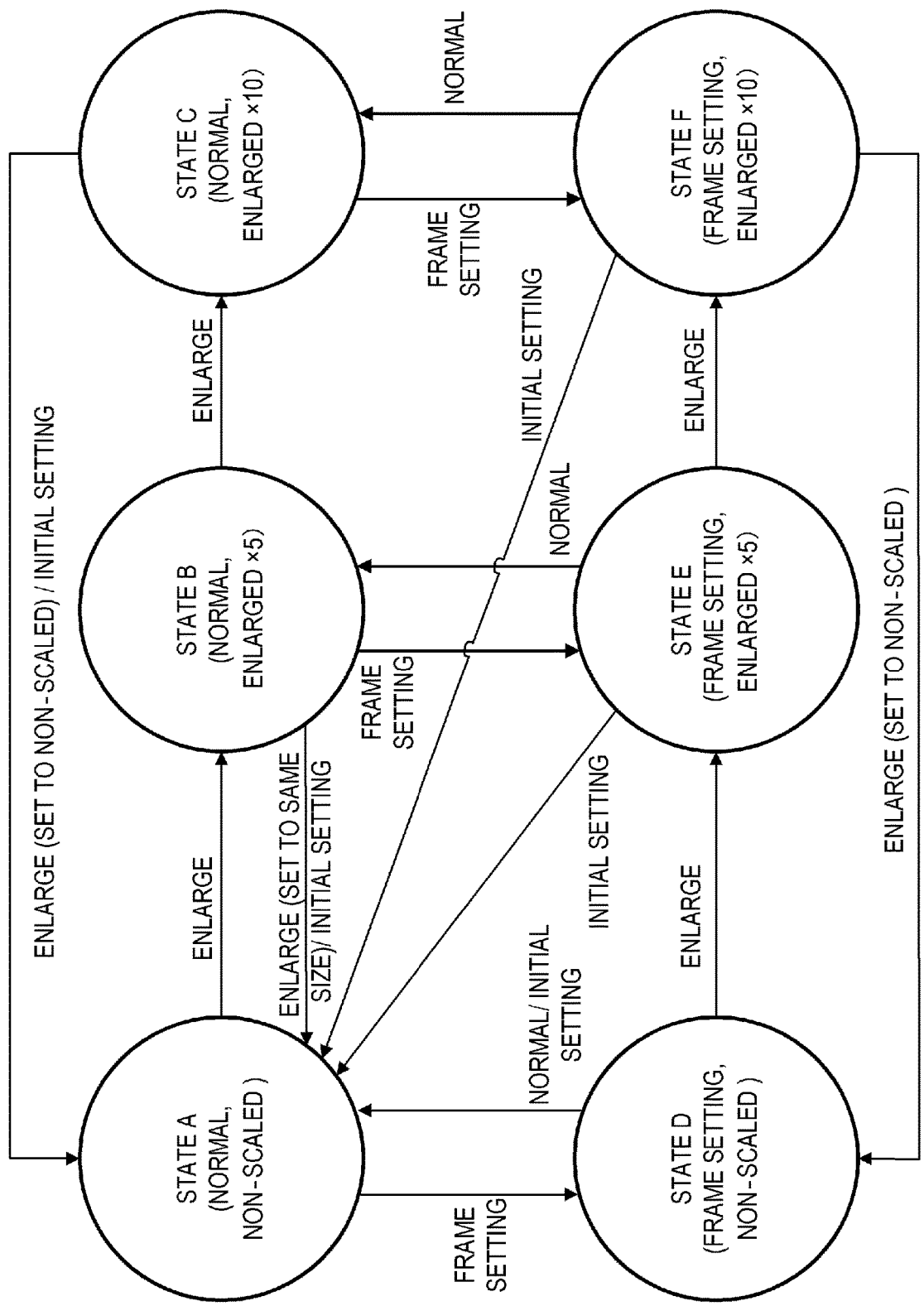
FIG. 8 is a diagram showing states of a digital camera according to a first modification.

Specifically, as shown in FIG. 8, transitions in accordance with the following user operations are permitted in addition to the state transitions shown in FIG. 3B.

In the state B, when an operation for changing the setting state to "frame setting" is performed with respect to the operating unit 70, a transition is made to the state E.

In the state E, when an operation for changing the setting state to "normal" is performed with respect to the operating unit 70, a transition is made to the state B.

In the state C, when an operation for changing the setting state to "frame setting" is performed with respect to the operating unit 70, a transition is made to the state F.

In the state F, when an operation for changing the setting state to "normal" is performed with respect to the operating unit 70, a transition is made to the state C.

Therefore, since processes of S2002 and S4002 among the processes of the flow charts shown in FIGS. 6A and 6B are changed from the first embodiment, only the two processes will be described below.

In S2002, the system control unit 50 changes the setting state to "frame setting". When the process of S2002 is finished, the process flow makes a transition to S4001.

In S4002, the system control unit 50 changes the setting state to "frame setting". When the process of S4002 is finished, the process flow makes a transition to S2001.

Effects

As described above, by permitting a transition from the state B or the state C to the state E or the state F, a setting state can be changed without first changing the state to the state A or the state D. Therefore, the user can perform settings of the digital camera 100 with a smaller number of procedures even during an enlarged display of a live view image.

<Other Embodiments>

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-133360, filed on Jul. 13, 2018, which is hereby incorporated by reference herein in its entirety.

What is claimed is:

1. An image sensing apparatus, comprising:
an image sensor configured to capture an image;
a display configured to display a full screen image that represents an entire range of a live view image captured by the image sensor; and
a memory and at least one processor and/or at least one circuit to perform the operations of the following units:
a display controlling unit configured to switch an image to be displayed by the display between an enlarged image that represents a partial range of the live view image and the full screen image; and
a control unit configured to perform, in accordance with a predetermined operation that is an operation other than an operation to the display, (1) a first setting for determining a setting parameter of the image sensor in a first state and (2) a second setting for determining a predetermined range of the live view image in a second state,
wherein in a case where the predetermined operation is performed while the display displays the enlarged image, (A) the display controlling unit does not switch the image displayed by the display to the full screen image, and (B) the control unit (B1) performs the first setting if the display is in the first state, and (B2) performs the second setting if the display is in the second state,
wherein the predetermined operation includes an operation to a first operation member that is an operation member which accepts a dial operation and an operation to a second operation member which differs from the first operation member, and
wherein the control unit is further configured to perform, in the second state, the second setting in a finer unit in a case in accordance with an operation to the second operation member than in a case in accordance with an operation to the first operation member.

2. The image sensing apparatus according to claim 1, wherein the first state is a state where the display further displays an operating unit which accepts an operation for setting the setting parameter, and
wherein the second state is a state where the display does not display the operating unit.

3. The image sensing apparatus according to claim 1, wherein the control unit is further configured to determine a setting parameter of exposure as the first setting.

4. The image sensing apparatus according to claim 1, wherein the control unit is further configured to determine a range of focus detection as the second setting.

5. The image sensing apparatus according to claim 1, wherein the second operation member are cross keys, and
wherein a setting corresponding to each key of the cross keys can be arbitrarily determined by a user in advance.

6. The image sensing apparatus according to claim 1, wherein the control unit is further configured to be able to perform, in accordance with an operation to the display, the second setting in cases of both the first state and the second state.

7. A control method of an image sensing apparatus including an image sensor to capture an image and a display to display a full screen image that represents an entire range of a live view image captured by the image sensor, the control method comprising:
a display control step of switching an image to be displayed by the display between an enlarged image that represents a partial range of the live view image and the full screen image; and
a control step of performing, in accordance with a predetermined operation that is an operation other than an operation to the display, (1) a first setting for determining a setting parameter of the image sensor in a first state and (2) a second setting for determining a predetermined range of the live view image in a second state,
wherein in a case where the predetermined operation is performed while the display displays the enlarged image, (A) in the display control step, the image displayed by the display is not switched to the full screen image, and (B) in the control step, (B1) the first setting is performed if the display is in the first state, and (B2) the second setting is performed if the display is in the second state;

wherein the predetermined operation includes an operation to a first operation member that is an operation member which accepts a dial operation and an operation to a second operation member which differs from the first operation member, and wherein the control step further comprises performing, in the second state, the second setting in a finer unit in a case in accordance with an operation to the second operation member than in a case in accordance with an operation to the first operation member.

8. A non-transitory computer readable medium that stores a program, wherein the program causes a computer to execute a control method of an image sensing apparatus including an image sensor to capture an image and a display to display a full screen image that represents an entire range of a live view image captured by the image sensor, the control method comprising:

a display control step of switching an image to be displayed by the display between an enlarged image that represents a partial range of the live view image and the full screen image; and a control step of performing, in accordance with a predetermined operation that is an operation other than an operation to the display, (1) a first setting for determining a setting parameter of the image sensor in a first state and (2) a second setting for determining a predetermined range of the live view image in a second state, wherein in a case where the predetermined operation is performed while the display displays the enlarged image, (A) in the display control step, the image displayed by the display is not switched to the full screen image, and (B) in the control step, (B1) the first setting is performed if the display is in the first state, and (B2) the second setting is performed if the display is in the second state;

wherein the predetermined operation includes an operation to a first operation member that is an operation member which accepts a dial operation and an operation to a second operation member which differs from the first operation member, and wherein the control step further comprises performing, in the second state, the second setting in a finer unit in a case in accordance with an operation to the second operation member than in a case in accordance with an operation to the first operation member.

* * * * *